US009251781B1

(12) United States Patent
Ahmed

(10) Patent No.: US 9,251,781 B1
(45) Date of Patent: Feb. 2, 2016

(54) PULSER LOGIC METHOD AND SYSTEM FOR AN ULTRASOUND BEAMFORMER

(71) Applicant: KING SAUD UNIVERSITY, Riyadh (SA)

(72) Inventor: Mostafa Abdelhamid Mohamed Ahmed, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 14/680,006

(22) Filed: Apr. 6, 2015

(51) Int. Cl.
*H04B 1/02* (2006.01)
*G10K 11/34* (2006.01)

(52) U.S. Cl.
CPC .................................... *G10K 11/341* (2013.01)

(58) Field of Classification Search
CPC ........................... G01K 11/341; G10K 11/341
USPC ......................................................... 367/138
See application file for complete search history.

(56) References Cited

U.S. PATENT DOCUMENTS 5,653,236 A 8/1997 Miller
6,366,227 B1 * 4/2002 Rigby ................. G01S 7/52046 341/143
6,487,433 B2 * 11/2002 Chiao ................. G01S 7/52047 600/407
7,901,358 B2 3/2011 Mehi et al.
8,659,976 B2 * 2/2014 Cotterill .................... G01S 3/86 367/118
2011/0012662 A1 1/2011 Ma et al.
2013/0188457 A1 7/2013 Nielsen et al.

* cited by examiner

*Primary Examiner* — Mark Hellner
(74) *Attorney, Agent, or Firm* — Richard C. Litman

(57) ABSTRACT

The pulser logic method and system for an ultrasound beamformer is based on using memory blocks instead of ordinary binary counters to accomplish transmit focusing of an ultrasound beam. This method reduces the use count of logic blocks (cost reduction) and facilitates the FPGA floor planner routing, increasing the design overall speed (performance enhancement). The exemplary design disclosed herein is for sixteen channels, but can be adjusted for any number of beamformer channels. The design may use, for example, a Xilinx Spartan-3 field programmable gate array (FPGA).

18 Claims, 7 Drawing Sheets

PULSER LOGIC METHOD AND SYSTEM FOR AN ULTRASOUND BEAMFORMER

BACKGROUND OF THE INVENTION

1. Field of the Invention

The present invention relates to ultrasonic transducer control, and particularly to a pulser logic method and system for an ultrasound beamformer utilizing minimal logic blocks in a field programmable gate array (FPGA).

2. Description of the Related Art

A travelling plane wave will tend to spread from the edges as it travels using a process of diffraction. This phenomenon is described by the Huygens-Fresnel principle, which describes each point on a wave front as a source for an expanding radial wave. As the wave expands, its energy is spread across a greater region. The further the wave has traveled, the greater the reduction in wave amplitude, and the greater the reduction in amplitude of any reflections from the wave. In order to create a high amplitude wave-front (to improve the echo strength), the energy from the wave can be focused. Focusing the wave controls the travel path of the acoustic energy so that its signal strength is maximized within a desired region. A transducer is any object that transforms energy from one type to another. In ultrasound, electrical energy is transformed into acoustic energy, and the reverse. Yet this energy needs to be focused. Typically, ultrasound transducers are geometrically focused, which means that the focal point is determined by the curvature of the transducer. With this type of transducer the focal point cannot be easily changed, and for this reason geometrically-focused transducers have limited use in a clinical setting.

A newer type of ultrasound transducer divides the transducer surface into sub-regions, each having an element in an array that can be separately controlled so that the elements in a transducer array are excited at different times (by adjusting the pattern of delay times) to focus the ultrasound beam. This is called transmit focusing. The beam may be focused straight ahead, or by skewing the transmit delay pattern so that the beam is no longer symmetric about the central axis of the transducer, the beam may be steered at an angle. Conventional, the pattern of pulses has been controlled by 16-bit binary counters. While effective, it would be desirable to accomplish transmit focusing using less memory at a faster overall speed.

Thus, a pulser logic method and system for an ultrasound beamformer solving the aforementioned problems is desired.

SUMMARY OF THE INVENTION

The pulser logic method and system for an ultrasound beamformer is based on using memory blocks instead of ordinary binary counters to accomplish transmit focusing of an ultrasound beam. This method reduces the use count of logic blocks (cost reduction) and facilitates the FPGA floor planner routing, increasing the design overall speed (performance enhancement). The exemplary design disclosed herein is for sixteen channels, but can be adjusted for any number of beamformer channels. The design may use, for example, a Xilinx Spartan-3 field programmable gate array (FPGA).

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
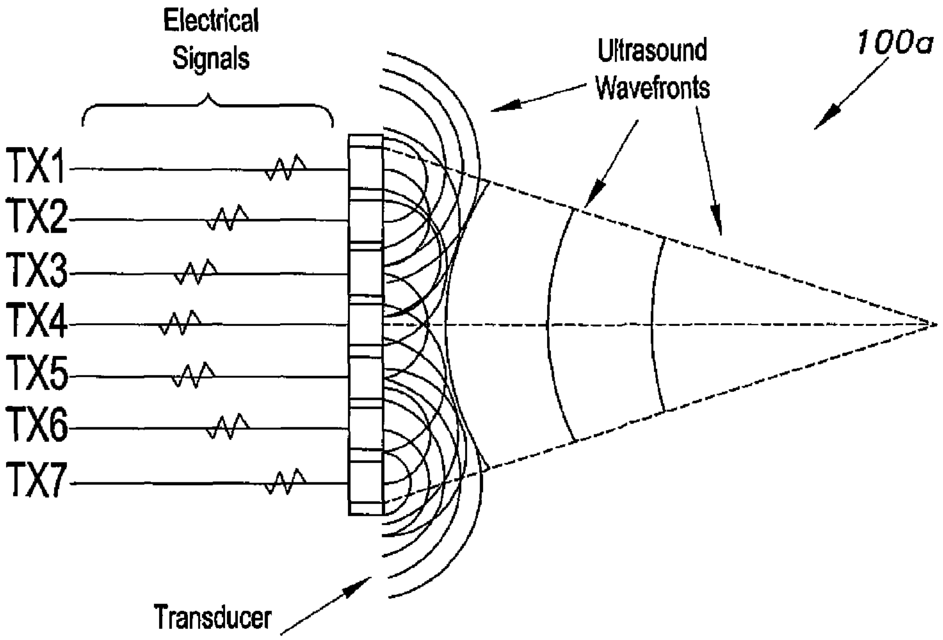
FIG. 1A is a schematic diagram showing constructive interference of radial wave fronts generated by a pattern of delayed electrical excitation pulses to produce a combined focused ultrasound wave by transmit focusing.
Figure 1B:
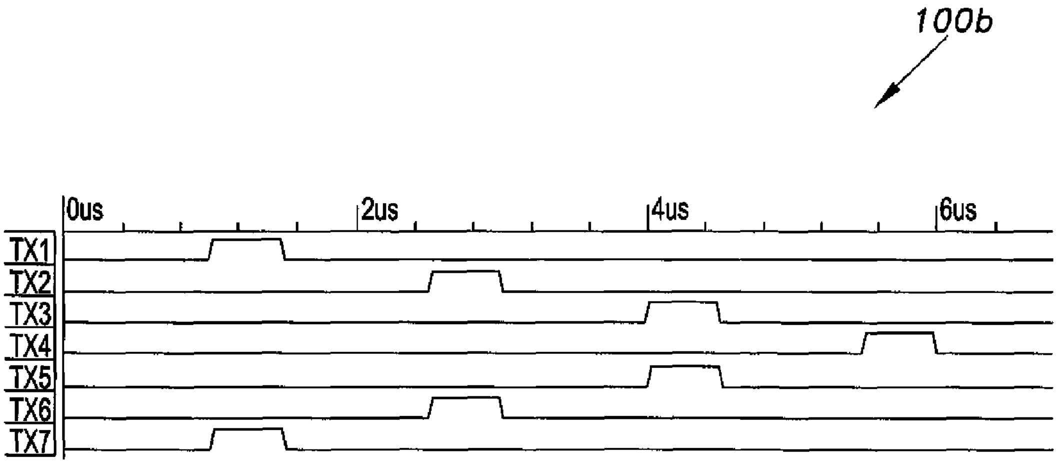
FIG. 1B is a waveform diagram showing an exemplary pulser excitation delay pattern to control the focal region of an ultrasound transducer array by transmit focusing.

The pulser logic method and system for an ultrasound beamformer is based on using memory blocks in a field programmable gate array instead of ordinary binary counters. The exemplary design is for 16 channels, but can be adjusted for any number of beamformer channels. The present design may use, for example, a Xilinx Spartan-3 field programmable gate array (FPGA). The beamformer has an array transducer that divides the transducer surface into sub regions, each of which can be controlled separately through separate electrical connections. The subdivided regions of an array are referred to as elements. When each element in an array is excited at different times, the diffraction of the individual wave fronts generated from each element can be planned in order to create a focused pulse 100*a*, as shown in FIG. 1A. Since it is the timing of the electrical excitation that creates the converging acoustic wavefronts, by adjusting a timing sequence comprising the pattern of delays applied, the focal region can be adjusted. This process is called transmit focusing, as shown in the transmit focusing plot 100*b* of FIG. 1B.

Figure 2A:
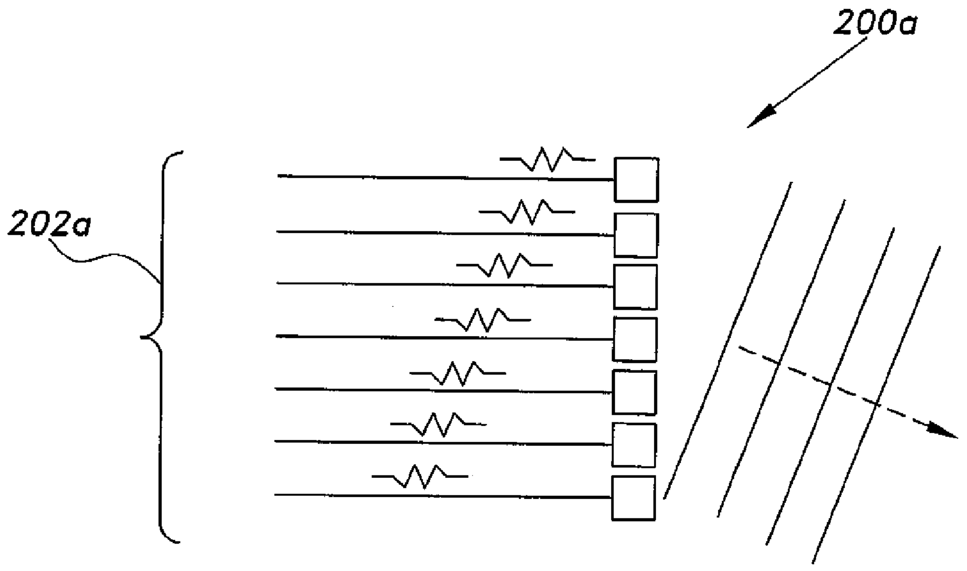
FIG. 2A is a schematic diagram showing an example of a non-symmetric pulser excitation pattern to direct an ultrasound beam off of the central transducer axis.
Figure 2B:
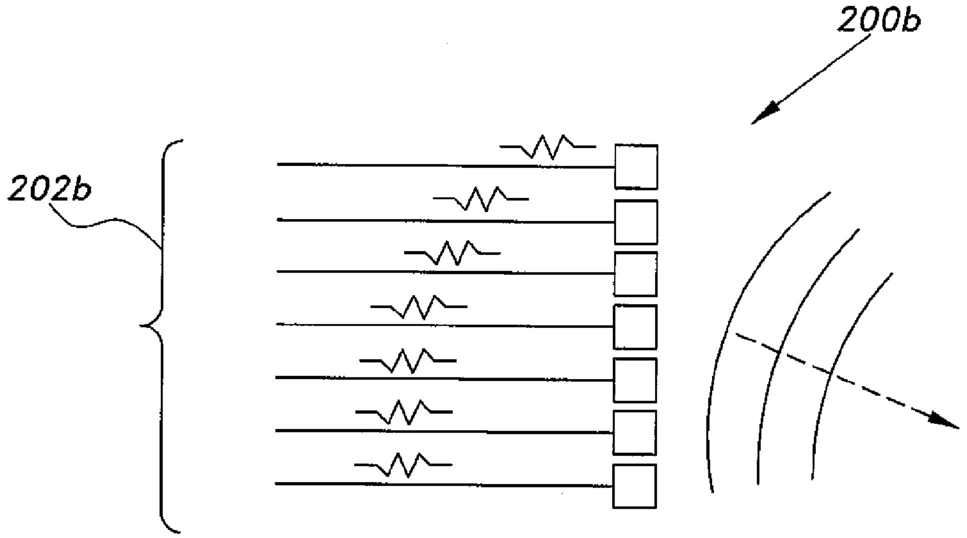
FIG. 2B is a schematic diagram showing a steered focused ultrasound beam.

Array transducers also make it possible to steer the beam off the transducer axis. Beam steering (illustrated in FIG. 2A) is accomplished by skewing the transmit delay pattern 202*a* so that it is no longer symmetric about the central axis of the transducer 200*a*. The resulting ultrasound wave front is angled or steered away from the axis. Transducer arrays that employ beam steering as well as beam focusing are referred to as phased arrays, and can result in the pattern 202*b* resulting from focused transducer array 200*b*, as shown in FIG. 2B. It should be noted that there are practical limits to the possible steering angles that the transducer can achieve. Typically steering angles are kept within the front 90° arc, beyond which steering becomes difficult due to the limited directivity of the array elements. Transmit focusing and beam steering can also be combined so that the beam is focused along a steered path as shown in FIG. 2B.

Figure 3:
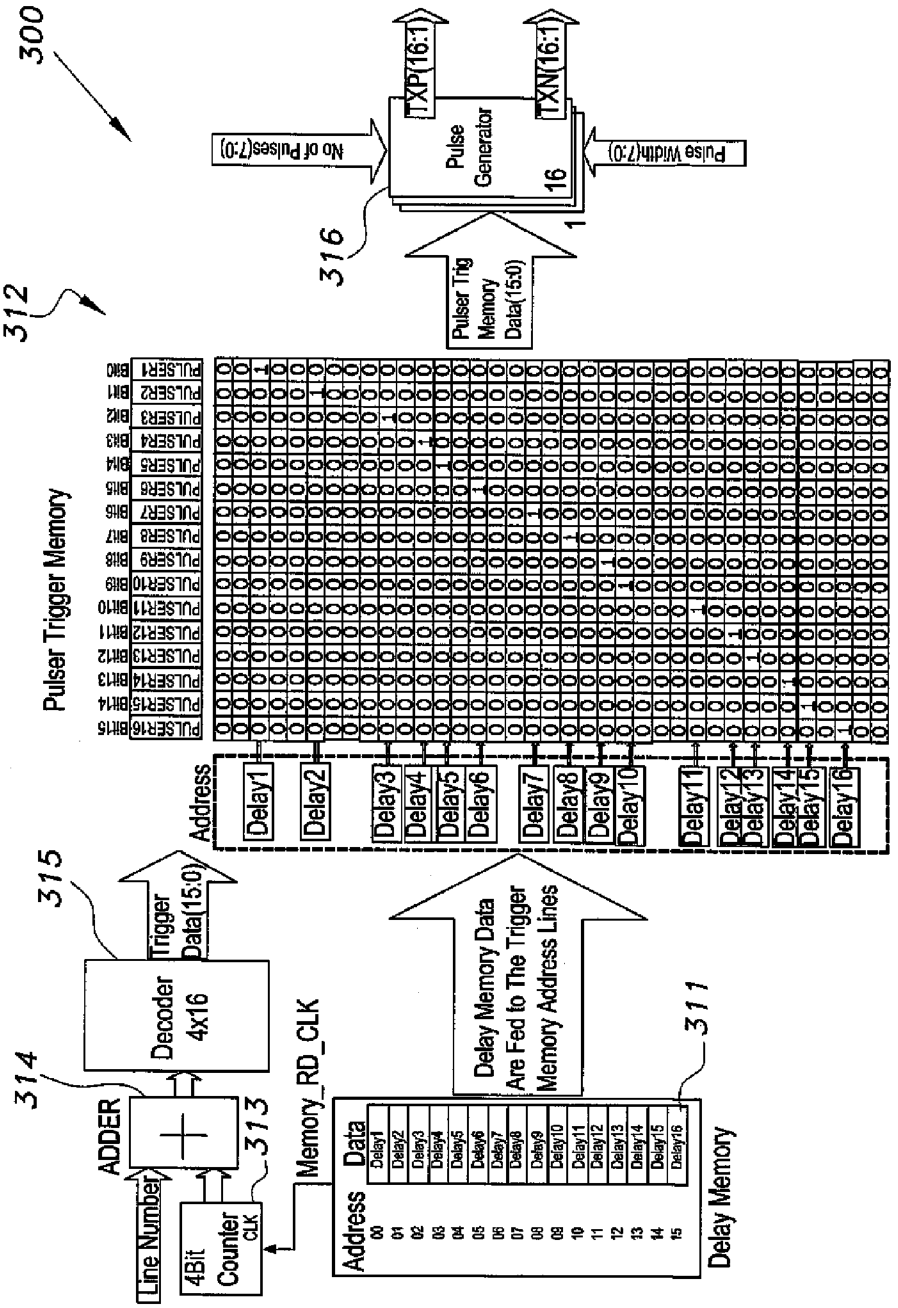
FIG. 3 is a block diagram showing a pulser logic module in a pulser logic method and system for an ultrasound beamformer according to the present invention.
Figure 4:
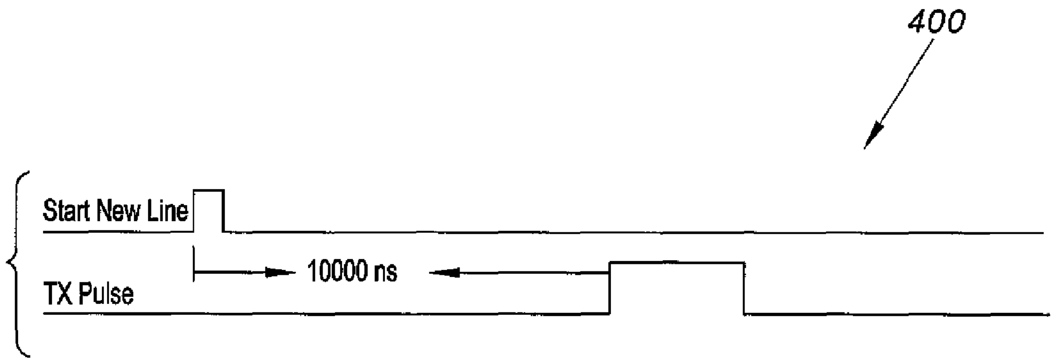
FIG. 4 is a waveform diagram showing a start new line waveform pulse and an exemplary pulser transmit waveform implementing a calculated required delay in a pulser logic method and system for an ultrasound beamformer according to the present invention.

The ultrasound beamforming method utilizes the pulser logic design 300 of FIG. 3, which replaces the function of ordinary sixteen-bit binary counters with two memory blocks 311, 312. Each of them is sixteen bit by using only two memory blocks, a delay memory 311 and a pulser trigger memory 312. The delay memory 311 stores delay values (in master clock number of cycles) needed for each pulser to begin emitting TX pulses from the start of the ultrasound line, as shown in the waveform diagram 400 of FIG. 4. Regarding FIG. 4, if master CLK=100 MHz and TX Pulse required delay=10,000 ns, the delay value stored for this pulser inside the delay memory 311=10,000 ns*CLK=1,000. A delay value is two bytes wide, having the format shown in Table 1, where bit 15 is the pulser ON/OFF function. If the last bit is one, then the pulser is Off. This feature helps to turn off some of the pulsers in order to remove image artifacts.

TABLE 1

| Delay Register (15:0) Format | |
|---|---|
| Bit 15 | Bit (14:0) |
| $\overline{\text{ON}}$/OFF | Delay Value |

The exemplary design of the present system utilizes sixteen pulsers in the beamformer (although a different number of pulsers may be used), and assuming that there is only one focal zone in the required image, sixteen locations inside the delay memory 311 are used to store the required delays for the pulsers (Delay1, Delay2, . . . Delay16). Thus each location in the delay memory 311 is two bytes wide.

A second pulser trigger memory 312 has a data width of sixteen bits, which equals the number of pulsers in the beamformer, each bit of the sixteen corresponding to one of the pulsers. This bit is used as a pulser trigger. The depth of the pulser trigger memory 312 should be larger than the maximum required delay value for all pulsers (in master clock number of cycles). For example, if master CLK=100 MHz and the maximum required delay for the pulsers is 10 μs, then the depth of the pulser trigger memory 312=10 μs*CLK=1000 locations.

Figure 5A:
FIG. 5A is an exemplary bit pattern of data in the pulser trigger memory at address location Delay 5 where Pulser5 has the delay value to start transmit firing transmit pulses in a pulser logic method and system for an ultrasound beamformer according to the present invention.

The delay memory 311 data bus is connected to the address lines of the pulser trigger memory 312. The pulser required delay value is read from the delay memory. The data values written inside the pulser trigger memory 312 at each address location (pulser required delay value) are zeros, except a one at the pulser bit location index having the required delay value to start firing transmit (TX) pulses. Thus, trigger data comprises a double byte with fifteen locations=0, the location number sixteen being one. The bit pattern 500*a* of FIG. 5A shows an example of the generated pulser trigger memory 312 data.

To generate this data pattern, use a four-bit counter 313 with the counter clock (CLK) being the delay memory 311, read CLK. Thus, for each new count from the binary counter, a new pulser delay value (Pulser Trigger Memory Address) is read from delay memory 311. Using a four-bit adder 314, the output of the binary counter 313 is added to the lowest four bits of the ultrasound line number (for example, assume line number (3:0)=0. The outputs of the adder 14 are the inputs to a four-bit decoder 315. Thus, when the counter counts from 0 to 15, the delay memory 311 outputs delay values from Delay1 to Delay16 (pulser trigger memory address lines), and at the same time, the 4-bit decoder generates pulser memory trigger data (15:0) from 0000 0000 0000 0001 to 1000 0000 0000 0000. This process is shown in Table 2.

TABLE 2

Data Pattern Generation

| Line Number | Four-Bit Counter Output | Four-Bit Adder Output | Pulser Trigger Memory Data (15:0) | Pulser Trigger Memory Address = delay values read from Delay Memory |
|---|---|---|---|---|
| 0 | 0 | 0 | 0000 0000 0000 0001 | Delay1 |
| | 1 | 1 | 0000 0000 0000 0010 | Delay2 |
| | 2 | 2 | 0000 0000 0000 0100 | Delay3 |
| | 3 | 3 | 0000 0000 0000 1000 | Delay4 |
| | 4 | 4 | 0000 0000 0001 0000 | Delay5 |
| | 5 | 5 | 0000 0000 0010 0000 | Delay6 |
| | 6 | 6 | 0000 0000 0100 0000 | Delay7 |
| | 7 | 7 | 0000 0000 1000 0000 | Delay8 |
| | 8 | 8 | 0000 0001 0000 0000 | Delay9 |
| | 9 | 9 | 0000 0010 0000 0000 | Delay10 |
| | 10 | 10 | 0000 0100 0000 0000 | Delay11 |
| | 11 | 11 | 0000 1000 0000 0000 | Delay12 |
| | 12 | 12 | 0001 0000 0000 0000 | Delay13 |
| | 13 | 13 | 0010 0000 0000 0000 | Delay14 |
| | 14 | 14 | 0100 0000 0000 0000 | Delay15 |
| | 15 | 15 | 1000 0000 0000 0000 | Delay16 |

For example, suppose the delay memory 311 has the following contents, as shown in Table 3.

TABLE 3

Delay Memory Single Focal Zone

| Address | Delay Values = Pulser Trigger Memory Address |
|---|---|
| 0 | Delay1 = 2 |
| 1 | Delay2 = 4 |
| 2 | Delay3 = 6 |
| 3 | Delay4 = 8 |
| 4 | Delay5 = 10 |
| 5 | Delay6 = 12 |
| 6 | Delay7 = 14 |
| 7 | Delay8 = 16 |
| 8 | Delay9 = 16 |
| 9 | Delay10 = 14 |
| 10 | Delay11 = 12 |
| 11 | Delay12 = 10 |
| 12 | Delay13 = 8 |
| 13 | Delay14 = 6 |
| 14 | Delay15 = 4 |
| 15 | Delay16 = 2 |

Then the pulser trigger memory 312 contents will be as shown in Table 4.

TABLE 4

| Pulser Trigger Memory | | | | | | | | | | | | | | | | |
|---|---|---|---|---|---|---|---|---|---|---|---|---|---|---|---|---|
| Address | Bit | | | | | | | | | | | | | | | |
| (Pulser | 15 | 14 | 13 | 12 | 11 | 10 | 9 | 8 | 7 | 6 | 5 | 4 | 3 | 2 | 1 | 0 |
| Delay | Pulser | | | | | | | | | | | | | | | |
| Value) | 16 | 15 | 14 | 13 | 12 | 11 | 10 | 9 | 8 | 7 | 6 | 5 | 4 | 3 | 2 | 1 |
| 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 |
| 2 | 1 | 0 | 0 | 0 | 0 | 0 | 0 | 0 | 0 | 0 | 0 | 0 | 0 | 0 | 0 | 1 |
| 3 | 0 | 0 | 0 | 0 | 0 | 0 | 0 | 0 | 0 | 0 | 0 | 0 | 0 | 0 | 0 | 0 |
| 4 | 0 | 1 | 0 | 0 | 0 | 0 | 0 | 0 | 0 | 0 | 0 | 0 | 0 | 0 | 1 | 0 |
| 5 | 0 | 0 | 0 | 0 | 0 | 0 | 0 | 0 | 0 | 0 | 0 | 0 | 0 | 0 | 0 | 0 |
| 6 | 0 | 0 | 1 | 0 | 0 | 0 | 0 | 0 | 0 | 0 | 0 | 0 | 0 | 1 | 0 | 0 |
| 7 | 0 | 0 | 0 | 0 | 0 | 0 | 0 | 0 | 0 | 0 | 0 | 0 | 0 | 0 | 0 | 0 |
| 8 | 0 | 0 | 0 | 1 | 0 | 0 | 0 | 0 | 0 | 0 | 0 | 0 | 1 | 0 | 0 | 0 |
| 9 | 0 | 0 | 0 | 0 | 0 | 0 | 0 | 0 | 0 | 0 | 0 | 0 | 0 | 0 | 0 | 0 |
| 10 | 0 | 0 | 0 | 0 | 1 | 0 | 0 | 0 | 0 | 0 | 0 | 1 | 0 | 0 | 0 | 0 |
| 11 | 0 | 0 | 0 | 0 | 0 | 0 | 0 | 0 | 0 | 0 | 0 | 0 | 0 | 0 | 0 | 0 |
| 12 | 0 | 0 | 0 | 0 | 0 | 1 | 0 | 0 | 0 | 0 | 1 | 0 | 0 | 0 | 0 | 0 |
| 13 | 0 | 0 | 0 | 0 | 0 | 0 | 0 | 0 | 0 | 0 | 0 | 0 | 0 | 0 | 0 | 0 |
| 14 | 0 | 0 | 0 | 0 | 0 | 0 | 1 | 0 | 0 | 1 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 | 0 |
| 16 | 0 | 0 | 0 | 0 | 0 | 0 | 0 | 1 | 1 | 0 | 0 | 0 | 0 | 0 | 0 | 0 |
| 17 | 0 | 0 | 0 | 0 | 0 | 0 | 0 | 0 | 0 | 0 | 0 | 0 | 0 | 0 | 0 | 0 |
| — | — | — | — | — | — | — | — | — | — | — | — | — | — | — | — | — |
| 1023 | 0 | 0 | 0 | 0 | 0 | 0 | 0 | 0 | 0 | 0 | 0 | 0 | 0 | 0 | 0 | 0 |

If pulser logic 300 receives a new ultrasound line trigger (e.g., FIRE), pulser logic 300 will start reading the pulser trigger memory data 312 from address 0 with the master CLK. Each pulser trigger memory data line 312 will function as pulser trigger line and will emit logic value one after time=1/CLK*(pulser delay value that corresponds to this pulser).

Figure 5B:
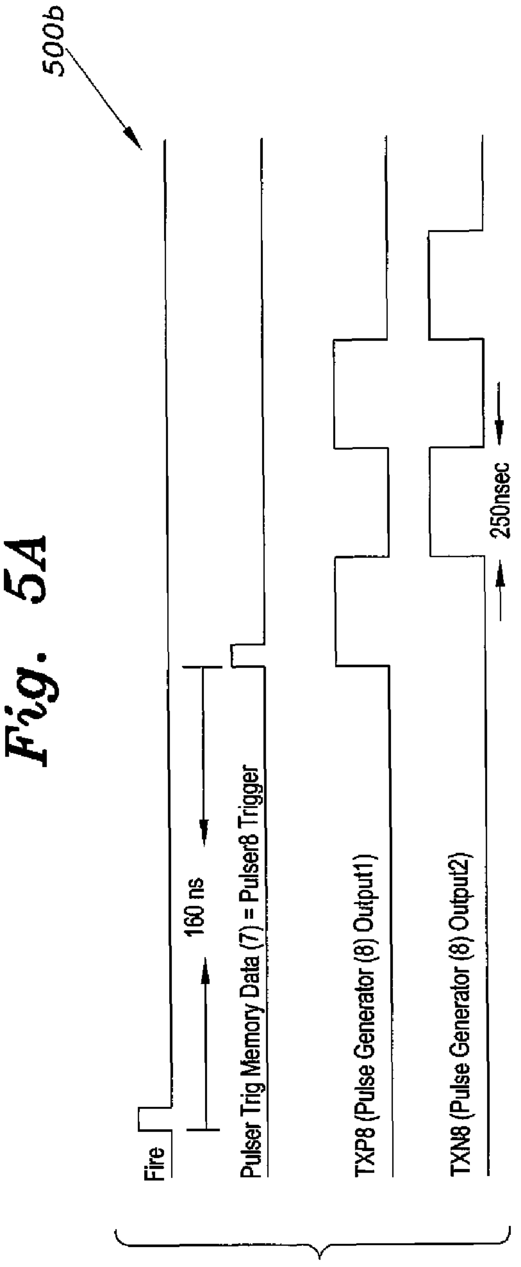
FIG. 5B is a waveform diagram showing an exemplary fire new line pulse, a trigger pulse, and the resulting output excitation waveforms in a pulser logic method and system for an ultrasound beamformer according to the present invention.

For example, pulser 8 delay value is 16 in Table 3. If pulser trigger memory 312 is read by the master CLK starting from address 0 (the CLK having an exemplary speed of 100 Mhz), pulser trigger memory data bit number eight (pulser trigger memory data (7)) will be as shown in waveform diagram 500*b* of FIG. 5B. By this, the ordinary counter implementation can be replaced to avoid consuming many logic blocks and to improve the total design speed.

The pulser logic design 300 includes sixteen pulsers, and therefore necessitates sixteen pulse generator modules 316. Pulse generator module 316 will generate the required number of TX pulses with the required pulse width (Pulse Width=1/CLK*PulseWidth(7:0)) upon receiving pulser trigger memory data 312 (pulser trigger memory data (7) in the present example). If pulser trigger memory data (7) is connected to the trigger input of pulse generator module (8), the TXP8 and TXN8 waveforms are generated (assuming number of pulses(7:0)=2 and pulse width=25).

To implement two focal zone images with the same pulser logic design 300, the number of delay values stored inside the delay memory is doubled, i.e., 32 memory locations are provided (16 locations for each focal zone). Each location width is two bytes. Table 5 shows the data content of the delay memory 311 to implement the two focal zone pulsers.

TABLE 5

| Delay Memory Content Implementing Two Focal Zone Pulsers | | |
|---|---|---|
| | Address | Delay Values = Pulser Trigger Memory Address |
| Focal Zone1 | 0 | Delay1 = 2 |
| | 1 | Delay2 = 4 |
| | 2 | Delay3 = 6 |
| | 3 | Delay4 = 8 |
| | 4 | Delay5 = 10 |
| | 5 | Delay6 = 12 |
| | 6 | Delay7 = 14 |
| | 7 | Delay8 = 16 |
| | 8 | Delay9 = 16 |
| | 9 | Delay10 = 14 |
| | 10 | Delay11 = 12 |
| | 11 | Delay12 = 10 |
| | 12 | Delay13 = 8 |
| | 13 | Delay14 = 6 |
| | 14 | Delay15 = 4 |
| | 15 | Delay16 = 2 |
| Focal Zone2 | 16 | Delay1 = 18 |
| | 17 | Delay2 = 20 |
| | 18 | Delay3 = 22 |
| | 19 | Delay4 = 24 |
| | 20 | Delay5 = 26 |
| | 21 | Delay6 = 28 |
| | 22 | Delay7 = 30 |
| | 23 | Delay8 = 32 |
| | 24 | Delay9 = 32 |
| | 25 | Delay10 = 30 |
| | 26 | Delay11 = 28 |
| | 27 | Delay12 = 26 |
| | 28 | Delay13 = 24 |
| | 29 | Delay14 = 22 |
| | 30 | Delay15 = 20 |
| | 31 | Delay16 = 18 |

TABLE 6

Pulser Trigger Memory Content Implementing Two Focal Zone Pulsers

| Address (Pulser Delay Value) | Bit 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | Pulser 16 | 15 | 14 | 13 | 12 | 11 | 10 | 9 | 8 | 7 | 6 | 5 | 4 | 3 | 2 | 1 |
| 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 |
| 2 | 1 | 0 | 0 | 0 | 0 | 0 | 0 | 0 | 0 | 0 | 0 | 0 | 0 | 0 | 0 | 1 |
| 3 | 0 | 0 | 0 | 0 | 0 | 0 | 0 | 0 | 0 | 0 | 0 | 0 | 0 | 0 | 0 | 0 |
| 4 | 0 | 1 | 0 | 0 | 0 | 0 | 0 | 0 | 0 | 0 | 0 | 0 | 0 | 0 | 1 | 0 |
| 5 | 0 | 0 | 0 | 0 | 0 | 0 | 0 | 0 | 0 | 0 | 0 | 0 | 0 | 0 | 0 | 0 |
| 6 | 0 | 0 | 1 | 0 | 0 | 0 | 0 | 0 | 0 | 0 | 0 | 0 | 0 | 1 | 0 | 0 |
| 7 | 0 | 0 | 0 | 0 | 0 | 0 | 0 | 0 | 0 | 0 | 0 | 0 | 0 | 0 | 0 | 0 |
| 8 | 0 | 0 | 0 | 1 | 0 | 0 | 0 | 0 | 0 | 0 | 0 | 0 | 1 | 0 | 0 | 0 |
| 9 | 0 | 0 | 0 | 0 | 0 | 0 | 0 | 0 | 0 | 0 | 0 | 0 | 0 | 0 | 0 | 0 |
| 10 | 0 | 0 | 0 | 0 | 1 | 0 | 0 | 0 | 0 | 0 | 0 | 1 | 0 | 0 | 0 | 0 |
| 11 | 0 | 0 | 0 | 0 | 0 | 0 | 0 | 0 | 0 | 0 | 0 | 0 | 0 | 0 | 0 | 0 |
| 12 | 0 | 0 | 0 | 0 | 0 | 1 | 0 | 0 | 0 | 0 | 1 | 0 | 0 | 0 | 0 | 0 |
| 13 | 0 | 0 | 0 | 0 | 0 | 0 | 0 | 0 | 0 | 0 | 0 | 0 | 0 | 0 | 0 | 0 |
| 14 | 0 | 0 | 0 | 0 | 0 | 0 | 1 | 0 | 0 | 1 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 | 0 |
| 16 | 0 | 0 | 0 | 0 | 0 | 0 | 0 | 1 | 1 | 0 | 0 | 0 | 0 | 0 | 0 | 0 |
| 17 | 0 | 0 | 0 | 0 | 0 | 0 | 0 | 0 | 0 | 0 | 0 | 0 | 0 | 0 | 0 | 0 |
| 18 | 1 | 0 | 0 | 0 | 0 | 0 | 0 | 0 | 0 | 0 | 0 | 0 | 0 | 0 | 0 | 1 |
| 19 | 0 | 0 | 0 | 0 | 0 | 0 | 0 | 0 | 0 | 0 | 0 | 0 | 0 | 0 | 0 | 0 |
| 20 | 0 | 1 | 0 | 0 | 0 | 0 | 0 | 0 | 0 | 0 | 0 | 0 | 0 | 0 | 1 | 0 |
| 21 | 0 | 0 | 0 | 0 | 0 | 0 | 0 | 0 | 0 | 0 | 0 | 0 | 0 | 0 | 0 | 0 |
| 22 | 0 | 0 | 1 | 0 | 0 | 0 | 0 | 0 | 0 | 0 | 0 | 0 | 0 | 1 | 0 | 0 |
| 23 | 0 | 0 | 0 | 0 | 0 | 0 | 0 | 0 | 0 | 0 | 0 | 0 | 0 | 0 | 0 | 0 |
| 24 | 0 | 0 | 0 | 1 | 0 | 0 | 0 | 0 | 0 | 0 | 0 | 0 | 1 | 0 | 0 | 0 |
| 25 | 0 | 0 | 0 | 0 | 0 | 0 | 0 | 0 | 0 | 0 | 0 | 0 | 0 | 0 | 0 | 0 |
| 26 | 0 | 0 | 0 | 0 | 1 | 0 | 0 | 0 | 0 | 0 | 0 | 1 | 0 | 0 | 0 | 0 |
| 27 | 0 | 0 | 0 | 0 | 0 | 0 | 0 | 0 | 0 | 0 | 0 | 0 | 0 | 0 | 0 | 0 |
| 28 | 0 | 0 | 0 | 0 | 0 | 1 | 0 | 0 | 0 | 0 | 1 | 0 | 0 | 0 | 0 | 0 |
| 29 | 0 | 0 | 0 | 0 | 0 | 0 | 0 | 0 | 0 | 0 | 0 | 0 | 0 | 0 | 0 | 0 |
| 30 | 0 | 0 | 0 | 0 | 0 | 0 | 1 | 0 | 0 | 1 | 0 | 0 | 0 | 0 | 0 | 0 |
| 31 | 0 | 0 | 0 | 0 | 0 | 0 | 0 | 0 | 0 | 0 | 0 | 0 | 0 | 0 | 0 | 0 |
| 32 | 0 | 0 | 0 | 0 | 0 | 0 | 0 | 1 | 1 | 0 | 0 | 0 | 0 | 0 | 0 | 0 |
| 33 | 0 | 0 | 0 | 0 | 0 | 0 | 0 | 0 | 0 | 0 | 0 | 0 | 0 | 0 | 0 | 0 |
| 1023 | 0 | 0 | 0 | 0 | 0 | 0 | 0 | 0 | 0 | 0 | 0 | 0 | 0 | 0 | 0 | 0 |

Figure 6:
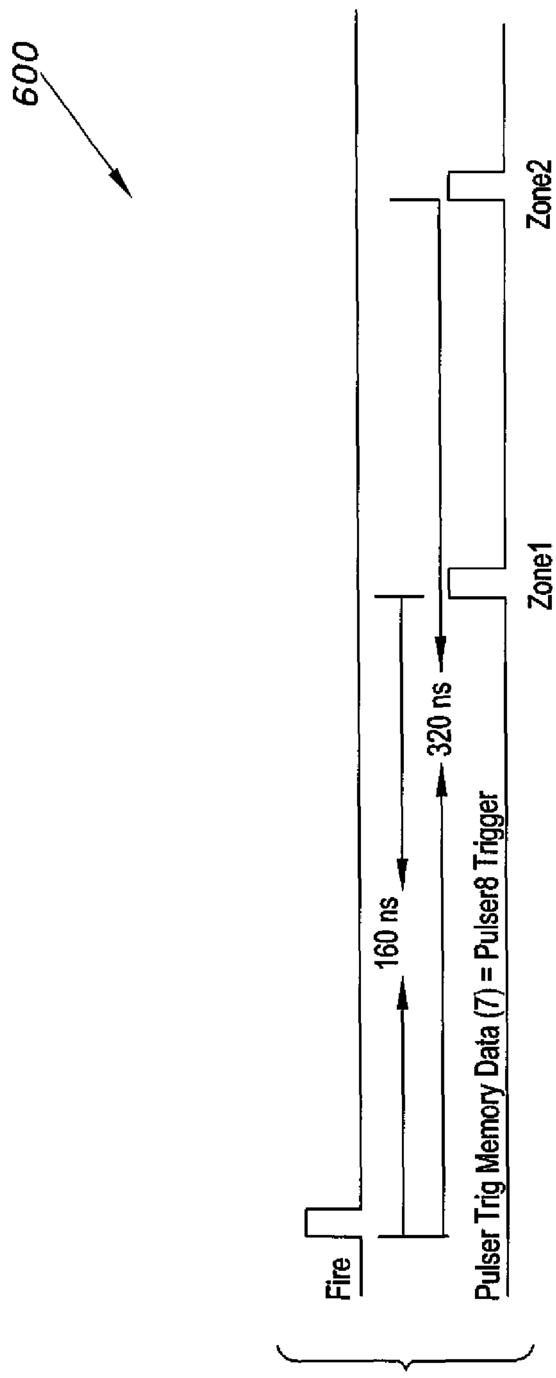
FIG. 6 is a waveform diagram showing an exemplary fire new line pulse and a trigger pulse for a Pulser Trigger Memory data line having two focal points (and hence two trigger pulses) in a pulser logic method and system for an ultrasound beamformer according to the present invention.

If the pulser trigger memory 312 in Table 5 is read with the master clock speed (e.g., 100 MHz) and, for example, pulser trigger memory data (7) (pulser8 trigger) is examined, it is seen that the table includes two focal zones, the first focal zone with delay=16, and the second focal zone with delay=32. Moreover, there are two triggers, the first trigger being at time=1/CLK*16=160 ns and the second trigger being at time=1/CLK*32=320 ns, as shown in the waveform diagram 600 of FIG. 6.

Figure 7:
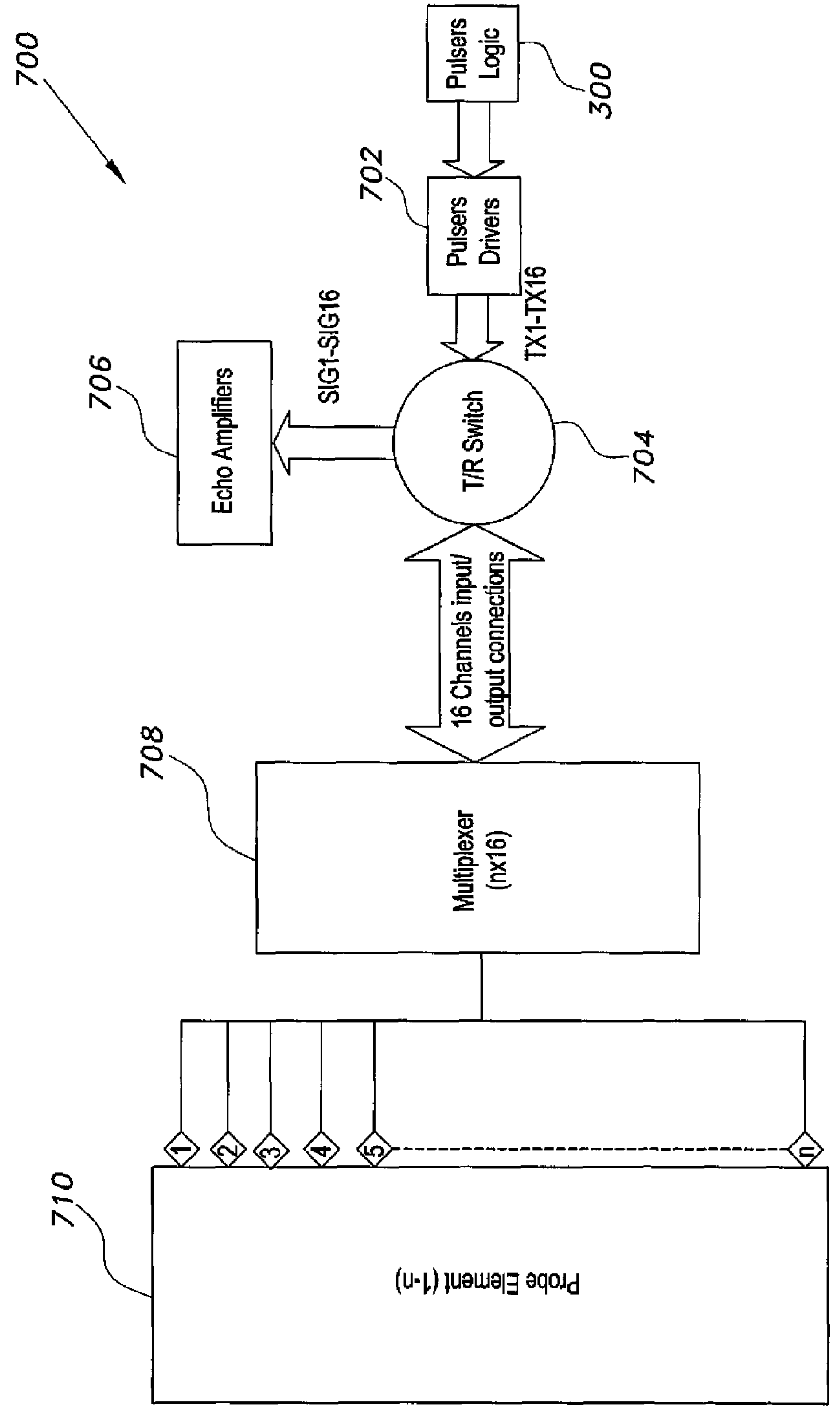
FIG. 7 is a block diagram for an ultrasound beamformer having a probe that has a greater number of elements than the transmit/receive array elements, requiring multiplexing the transmit waveforms and the received echoes in a pulser logic method and system for an ultrasound beamformer according to the present invention.

With respect to line rotation, FIG. 7 shows a block diagram of an ultrasound beamformer 700 having sixteen channels. There are 16 pulsers (TX1-TX16) and 16 echo lines (SIG1 to SIG16). The T/R switch 704 separates the high voltage (HV) transmit (TX) pulses sent to the probe from the echo received from the probe 710. As the number of probe elements may be greater than the number of pulsers/amplifiers, a multiplexer 708 is used to multiplex the 16 TX-RX lines to the selected 16 elements from the n probe elements in each line and then receive the echo from these elements and send it to the echo amplifiers 706. The select inputs of multiplexer 708 are changed every ultrasound line, thus requiring the multiplexer 708 to change the order of the echo received from the order of the TX pulses sent. Since the ultrasound echo lines are summed in a constructive interference, to get the best signal-to-noise ratio, the order of the delay values sent to the pulser logic is changed, each line matching the order of the RX echo line. See Table 7 below.

TABLE 7

Line Rotation Delay Order Scheme

| Line Number | Four-Bit Counter Output | Four-Bit Adder Output | Pulser Trigger MemoryData | Pulser Trigger Memory Address (Data read from Delayer Memory) |
|---|---|---|---|---|
| 1 | 0 | 1 | 0000 0000 0000 0010 | Delay1 |
| | 1 | 2 | 0000 0000 0000 0100 | Delay2 |
| | 2 | 3 | 0000 0000 0000 1000 | Delay3 |
| | 3 | 4 | 0000 0000 0001 0000 | Delay4 |
| | 4 | 5 | 0000 0000 0010 0000 | Delay5 |
| | 5 | 6 | 0000 0000 0100 0000 | Delay6 |
| | 6 | 7 | 0000 0000 1000 0000 | Delay7 |
| | 7 | 8 | 0000 0001 0000 0000 | Delay8 |
| | 8 | 9 | 0000 0010 0000 0000 | Delay9 |
| | 9 | 10 | 0000 0100 0000 0000 | Delay10 |
| | 10 | 11 | 0000 1000 0000 0000 | Delay11 |
| | 11 | 12 | 0001 0000 0000 0000 | Delay12 |
| | 12 | 13 | 0010 0000 0000 0000 | Delay13 |
| | 13 | 14 | 0100 0000 0000 0000 | Delay14 |
| | 14 | 15 | 1000 0000 0000 0000 | Delay15 |
| | 15 | 0 | 0000 0000 0000 0001 | Delay16 |

In the last description of the Pulser logic, we assumed line number (3:0)=0, so that Delay1 to Delay16 values are always assigned to Pulser1 to Pulser16 Respectively.

To implement the rotation of the delays needed in the ultrasound beamformer, the lowest four bits of the line number (changes from 0 to 15) are added to the output of the four-bit counter 313 and the output of the four-bit adder 314 are input to the four-bit decoder 315.

For example, if line number=1, the delay values will be assigned to the pulsers in the order shown in Table 7. As shown, Delay1 (D1) will be assigned to pulser 2 and Delay1 (D2) will be assigned for pulser 3, and the like. The complete delay rotation table when the line number changes from 0 to 15 is shown in Table 8.

TABLE 8

Complete Delay Rotation Table When Line Number Changes from 0 to 15

| Line number | Pulser | | | | | | | | | | | | | | | |
|---|---|---|---|---|---|---|---|---|---|---|---|---|---|---|---|---|
| (3:0) | 1 | 2 | 3 | 4 | 5 | 6 | 7 | 8 | 9 | 10 | 11 | 12 | 13 | 14 | 15 | 16 |
| 0 | D1 | D2 | D3 | D4 | D5 | D6 | D7 | D8 | D9 | D10 | D11 | D12 | D13 | D14 | D15 | D16 |
| 1 | D16 | D1 | D2 | D3 | D4 | D5 | D6 | D7 | D8 | D9 | D10 | D11 | D12 | D13 | D14 | D15 |
| 2 | D15 | D16 | D1 | D2 | D3 | D4 | D5 | D6 | D7 | D8 | D9 | D10 | D11 | D12 | D13 | D14 |
| 3 | D14 | D15 | D16 | D1 | D2 | D3 | D4 | D5 | D6 | D7 | D8 | D9 | D10 | D11 | D12 | D13 |
| 4 | D13 | D14 | D15 | D16 | D1 | D2 | D3 | D4 | D5 | D6 | D7 | D8 | D9 | D10 | D11 | D12 |
| 5 | D12 | D13 | D14 | D15 | D16 | D1 | D2 | D3 | D4 | D5 | D6 | D7 | D8 | D9 | D10 | D11 |
| 6 | D11 | D12 | D13 | D14 | D15 | D16 | D1 | D2 | D3 | D4 | D5 | D6 | D7 | D8 | D9 | D10 |
| 7 | D10 | D11 | D12 | D13 | D14 | D15 | D16 | D1 | D2 | D3 | D4 | D5 | D6 | D7 | D8 | D9 |
| 8 | D9 | D10 | D11 | D12 | D13 | D14 | D15 | D16 | D1 | D2 | D3 | D4 | D5 | D6 | D7 | D8 |
| 9 | D8 | D9 | D10 | D11 | D12 | D13 | D14 | D15 | D16 | D1 | D2 | D3 | D4 | D5 | D6 | D7 |
| 10 | D7 | D8 | D9 | D10 | D11 | D12 | D13 | D14 | D15 | D16 | D1 | D2 | D3 | D4 | D5 | D6 |
| 11 | D6 | D7 | D8 | D9 | D10 | D11 | D12 | D13 | D14 | D15 | D16 | D1 | D2 | D3 | D4 | D5 |
| 12 | D5 | D6 | D7 | D8 | D9 | D10 | D11 | D12 | D13 | D14 | D15 | D16 | D1 | D2 | D3 | D4 |
| 13 | D4 | D5 | D6 | D7 | D8 | D9 | D10 | D11 | D12 | D13 | D14 | D15 | D16 | D1 | D2 | D3 |
| 14 | D3 | D4 | D5 | D6 | D7 | D8 | D9 | D10 | D11 | D12 | D13 | D14 | D15 | D16 | D1 | D2 |
| 15 | D2 | D3 | D4 | D5 | D6 | D7 | D8 | D9 | D10 | D11 | D12 | D13 | D14 | D15 | D16 | D1 |

When implementing the design using Xilinx ISE Webpack 10.1 software, the auto generated reports from the program were used to show the efficiency (in terms of logic utilization and speed) of the present ultrasound beamformer pulser logic system using memory blocks instead of ordinary binary counter methods. The present Pulser logic function implemented inside an ultrasound beamformer reduces the total used number of compound logic blocks (Cost Reduction) and facilitates the floorplanner routing inside the field programmable gate array devices (the Xilinx Floorplanner is a graphically based tool that allows a designer to interactively and automatically place logic symbols from a hierarchical design into a Xilinx target FPGA). Table 9 shows some of the auto-generated reports on the present pulser logic for ultrasound beamformers.

TABLE 9

Xilinx ISE Webpack 10.1 Software Auto Generated Reports

| Device Info | Map Report | Timing Summary |
|---|---|---|
| Target Device: Spartan3 (xc3s400)<br>Target Package: pq208<br>Target Speed : −5 | Number of errors: 0<br>Number of warnings: 0<br>Logic Utilization:<br>Number of Slice Flip Flops: 249 out of 7,168 3%<br>Number of 4 input LUTs: 363 out of 7,168 5%<br>Logic Distribution:<br>Number of occupied Slices: 243 out of 3,584 6%<br>Number of Slices containing only related logic: 243 out of 243 100%<br>Number of Slices containing unrelated logic: | Speed Grade: −5<br>Minimum period: 7.363 ns (Maximum Frequency: 135.822 MHz<br>Minimum input arrival time before clock: 7.228 ns<br>Maximum output required time after clock: 6.306 ns<br>Maximum combinational path delay: No path found |

TABLE 9-continued

Xilinx ISE Webpack 10.1 Software Auto Generated Reports

| Device Info | Map Report | Timing Summary |
|---|---|---|
| | 0 out of 243 0%<br>Total Number of 4 input | |

TABLE 9-continued

Xilinx ISE Webpack 10.1 Software Auto Generated Reports

| Device Info | Map Report | Timing Summary |
|---|---|---|
| | LUTs: 387 out of 7,168 5%<br>Number used as logic: 330<br>Number used as a route-thru: 24<br>Number used as Shift registers: 33<br>Number of bonded IOBs: 54 out of 141 38%<br>IOB Flip Flops: 32<br>Number of RAMB16s: 2 out of 16 12%<br>Number of BUFGMUXs: 2 out of 8 25% | |

It is to be understood that the present invention is not limited to the embodiments described above, but encompasses any and all embodiments within the scope of the following claims.

I claim:

1. A pulser logic method for an ultrasound beamformer, comprising the steps of:

accessing digital logic memory blocks to establish a transducer element excitation timing sequence;

delivering the transducer element excitation timing sequence to a pulse generator, the pulse generator exciting selective pulsers of a multi-element ultrasound array transducer according to the excitation timing sequence;

using a delay memory block to store delay values in master clock number of cycles needed for each of the pulsers to begin emitting transmit pulses; and using a pulser trigger memory block having a bit data width corresponding to the number of pulsers in the multi-element ultrasound array transducer, the pulser trigger memory block triggering a corresponding one of the pulsers based on a delay timing associated with the delay memory block;

wherein the multi-element ultrasound array transducer forms a wave front focal point having a steerable position determined by the transducer element excitation timing sequence.

2. The pulser logic method according to claim 1, further comprising the step of providing a memory depth of the pulser trigger memory block, the memory depth being larger than a maximum required delay value for all of the pulsers, the delay value being computed in terms of master clock number of cycles.

3. The pulser logic method according to claim 2, further comprising the step of using a delay memory data bus to form address lines for the pulser trigger memory block.

4. The pulser logic method according to claim 3, further comprising the step of writing data values inside the pulser trigger memory block at each address location, the data values being zeros except for one data value written from an index representing a pulser bit location having a required delay value to start firing transmit (TX) pulses.

5. The pulser logic method according to claim 4, further comprising the step of using a four-bit counter having a clock (CLK) functioning as a delay memory read (CLK); and reading a new pulser delay value (Pulser Trigger Memory Address) from the delay memory for each new count from the four-bit counter.

6. The pulser logic method according to claim 5, further comprising the step of using a four-bit adder to add an output of the four bit counter to a lowest four bits of a line number of the ultrasound array transducer.

7. The pulser logic method according to claim 6, further comprising the step of outputting a result of the four-bit adder to an input of a four-bit decoder, the four-bit decoder having an output representing the trigger data written to the pulser trigger memory block.

8. The pulser logic method according to claim 7, further comprising the step of emitting a logic value of one after a time=1/CLK multiplied by the pulser delay value corresponding to said pulser.

9. The pulser logic method according to claim 8, wherein a number of modules of the pulse generator correspond 1:1 to the number of the pulsers in the ultrasound array.

10. The pulser logic method according to claim 8, wherein for any given module number, positive transmit waveforms and negative transmit waveforms are generated, assuming a predetermined number of pulses and a predetermined pulse width.

11. The pulser logic method according to claim 10, further comprising the steps of:

writing multiple focal zones into the pulser trigger memory block; and specifying a delay time unique for each of the multiple focal zones.

12. The pulser logic method according to claim 11, further comprising the step of outputting to a multiplexer a first plurality of input/output channels formed by the pulser logic method, the multiplexer selecting a second plurality of elements of the multi-element ultrasound array transducer for excitation.

13. The pulser logic method according to claim 12, further comprising the step of changing the select inputs of the multiplexer for every ultrasound line, the multiplexer changing the order of an echo received (RX) from the order of the TX pulses sent.

14. The pulser logic method according to claim 13, further comprising the steps of:

summing in a constructive interference the ultrasound echo lines; and changing the order of the delay values sent to the pulser logic, each line matching the order of a line of the RX echo to get the best signal to noise ratio.

15. A pulser logic system for an ultrasound beamformer, comprising:

digital logic memory blocks, wherein the digital logic memory blocks further comprise:

a delay memory block to store delay values in master clock number of cycles needed for each pulser to begin emitting transmit pulses; and a pulser trigger memory block having a bit data width corresponding to a number of pulsers in the multi-element ultrasound array transduce, the pulser trigger memory block triggering the array transducer pulser based on a delay timing associated with the delay memory block;

means for establishing a transducer element excitation timing sequence;

a transmit/receive (TR) switch;

a plurality of pulser drivers;

a multi-element ultrasound array transducer having n pulser elements; and means for delivering the transducer element excitation timing sequence to the plurality of pulser drivers, the pulser drivers exciting selective pulser elements of the multi-element ultrasound array transducer according to the excitation timing sequence;

wherein the multi-element ultrasound array transducer forms a wave front focal point having a steerable position determined by the transducer element excitation timing sequence.

16. The pulser logic system according to claim 15, further comprising:

a connection of the pulser drivers to the T/R switch;

a plurality of echo amplifiers connected to the T/R switch; and a multiplexer having m select input lines, output of the T/R switch being connected to the m select channel lines of the multiplexer, output of the multiplexer being connected to the pulser elements, the multiplexer changing the order of an echo received (RX) from the order of the TX pulses sent.

17. The pulser logic system according to claim 16, wherein the number of pulser elements n is greater than the m number of select channel lines, the multiplexer selecting m elements from the n probe elements in each line and then receiving the echo from these m elements and sending the received echo to the echo amplifiers.

18. The pulser logic system according to claim 15, wherein the digital logic memory blocks are formed from a field-programmable gate array (FPGA).

* * * * *